US009867461B1

(12) United States Patent
Smith

(10) Patent No.: US 9,867,461 B1
(45) Date of Patent: Jan. 16, 2018

(54) OBJECT STORAGE ASSEMBLY

(71) Applicant: Fernandez Smith, Villa Ridge, MO (US)

(72) Inventor: Fernandez Smith, Villa Ridge, MO (US)

( * ) Notice: Subject to any disclaimer, the term of this patent is extended or adjusted under 35 U.S.C. 154(b) by 0 days.

(21) Appl. No.: 15/364,820

(22) Filed: Nov. 30, 2016

(51) Int. Cl.
*A47B 45/00* (2006.01)
*F16B 7/10* (2006.01)

(52) U.S. Cl.
CPC ............. *A47B 45/00* (2013.01); *F16B 7/105* (2013.01); *Y10T 403/32483* (2015.01); *Y10T 403/7077* (2015.01)

(58) Field of Classification Search
CPC ... A47B 45/00; A47F 7/00; A47F 7/02; F16B 7/105; Y10T 403/32483; Y10T 403/7077
USPC .................. 211/207; 248/911, 912
See application file for complete search history.

(56) References Cited

U.S. PATENT DOCUMENTS

| 3,442,045 | A | * | 5/1969 | Green | A63H 15/06 |
| | | | | | 446/297 |
| 3,464,664 | A | | 9/1969 | Nugent | |
| 4,282,976 | A | * | 8/1981 | Fitzgerald | A47F 5/02 |
| | | | | | 211/163 |
| 4,934,658 | A | * | 6/1990 | Berg | A47G 27/0493 |
| | | | | | 248/408 |
| 5,033,528 | A | * | 7/1991 | Volcani | A45B 17/00 |
| | | | | | 160/351 |
| 6,042,080 | A | * | 3/2000 | Shepherd | B60R 11/00 |
| | | | | | 248/163.1 |
| 6,050,531 | A | | 4/2000 | Wilcox | |
| 6,371,686 | B1 | * | 4/2002 | Wu | A45B 19/04 |
| | | | | | 135/25.1 |
| 7,641,156 | B2 | | 1/2010 | Medders et al. | |
| 8,177,183 | B2 | | 5/2012 | Reinen | |
| D669,940 | S | | 10/2012 | Berkshire | |
| 8,376,341 | B2 | * | 2/2013 | Kocher | E04G 5/00 |
| | | | | | 182/129 |
| 9,010,710 | B1 | | 4/2015 | Young | |
| 2014/0183146 | A1 | * | 7/2014 | Feliciano-Perez | A47G 29/08 |
| | | | | | 211/1 |
| 2014/0209649 | A1 | * | 7/2014 | Schuster | A24F 13/08 |
| | | | | | 224/545 |
| 2016/0008070 | A1 | | 1/2016 | Choudhury et al. | |

FOREIGN PATENT DOCUMENTS

WO    WO2008033003    3/2008

* cited by examiner

*Primary Examiner* — Ko Hung Chan

(57) ABSTRACT

An object storage assembly includes a plurality of bases. A shaft unit is provided and the shaft unit is removably coupled to a selected one of the bases. The shaft unit has a telescopically adjustable length such that the shaft unit has a maximum height ranging between approximately 1.8 meters and 2.1 meters. A plurality of holders is provided and a selected one of the holders is removably coupled to the shaft unit. A plurality of objects is selectively positioned on the selected holder thereby facilitating the objects to be organized and stored.

7 Claims, 5 Drawing Sheets

OBJECT STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to storage devices and more particularly pertains to a new storage device for storing and organizing a plurality of objects.

BRIEF SUMMARY OF THE INVENTION

An embodiment of the disclosure meets the needs presented above by generally comprising a plurality of bases. A shaft unit is provided and the shaft unit is removably coupled to a selected one of the bases. The shaft unit has a telescopically adjustable length such that the shaft unit has a maximum height ranging between approximately 1.8 meters and 2.1 meters. A plurality of holders is provided and a selected one of the holders is removably coupled to the shaft unit. A plurality of objects is selectively positioned on the selected holder thereby facilitating the objects to be organized and stored.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
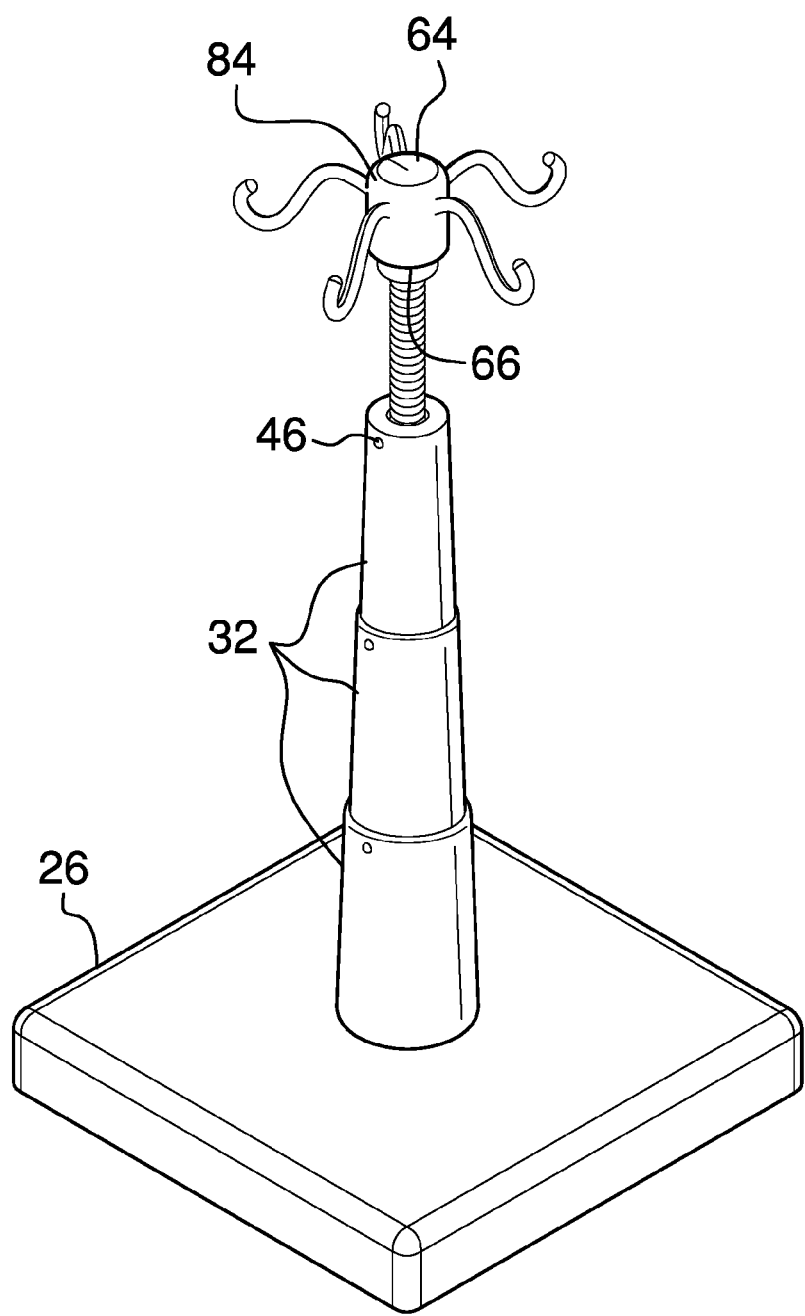
FIG. 1 is a perspective view of an object storage assembly according to an embodiment of the disclosure.
Figure 2:
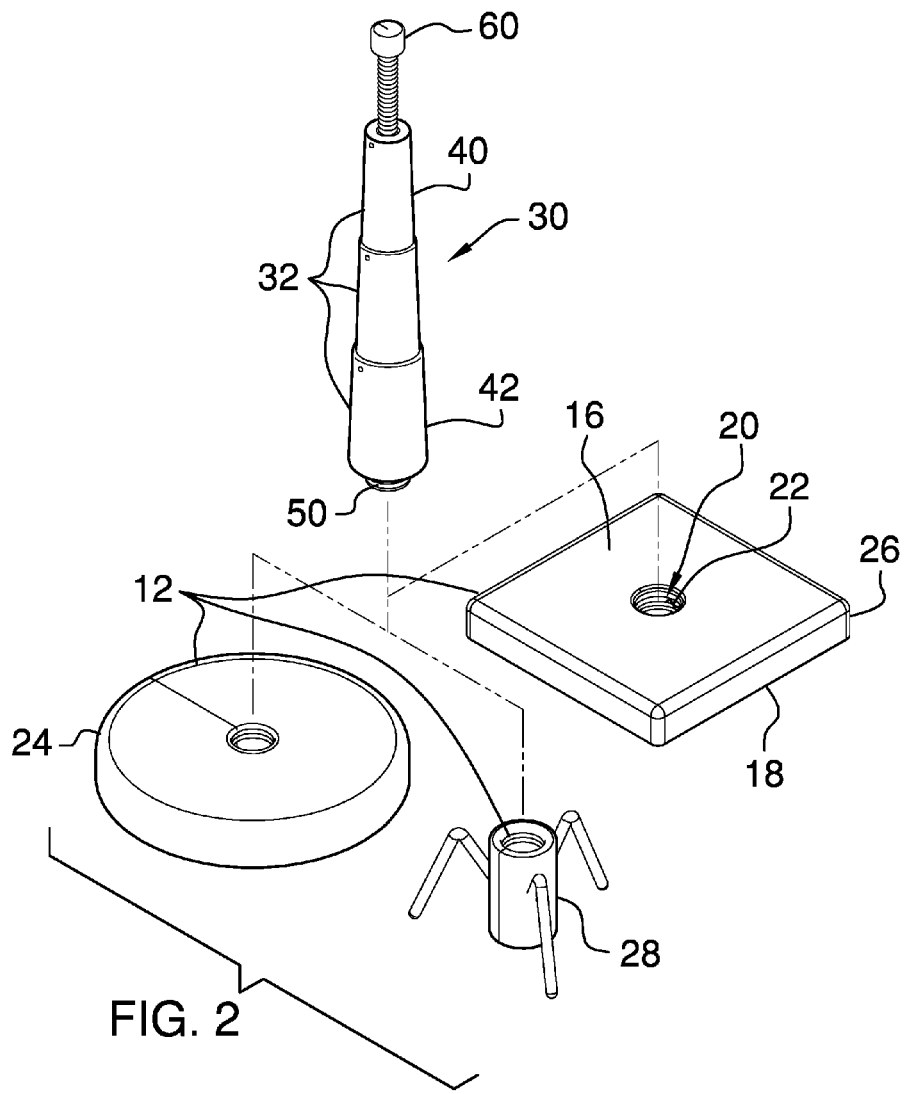
FIG. 2 is an exploded perspective view of an embodiment of the disclosure.
Figure 3:
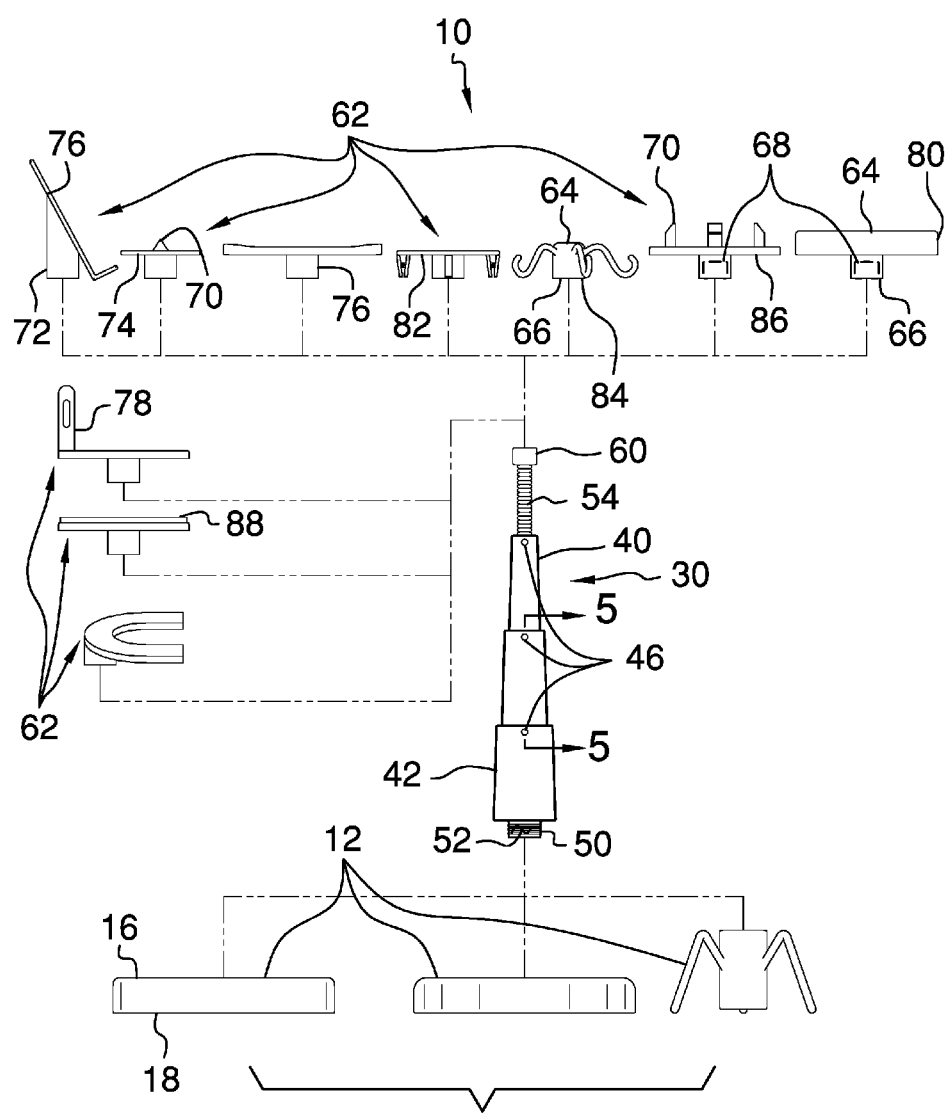
FIG. 3 is a kit view of an embodiment of the disclosure.
Figure 4:
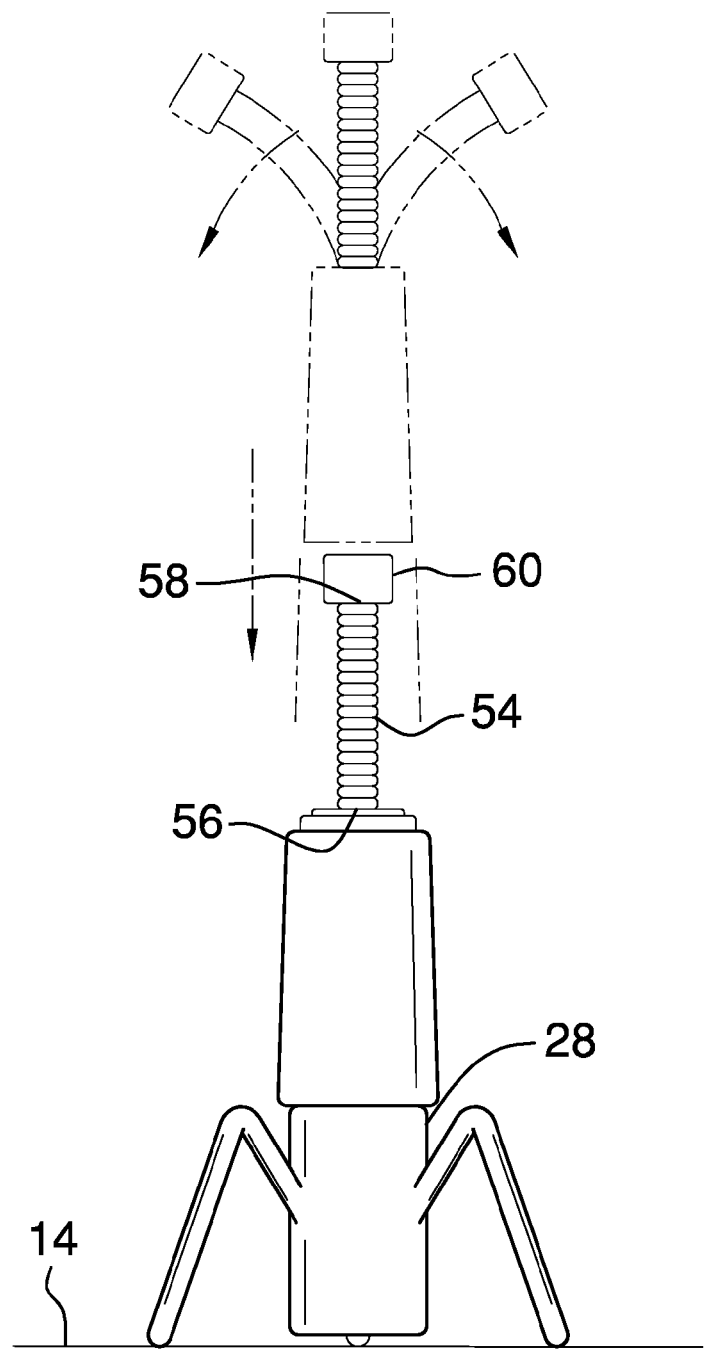
FIG. 4 is a front perspective view of an embodiment of the disclosure.
Figure 5:
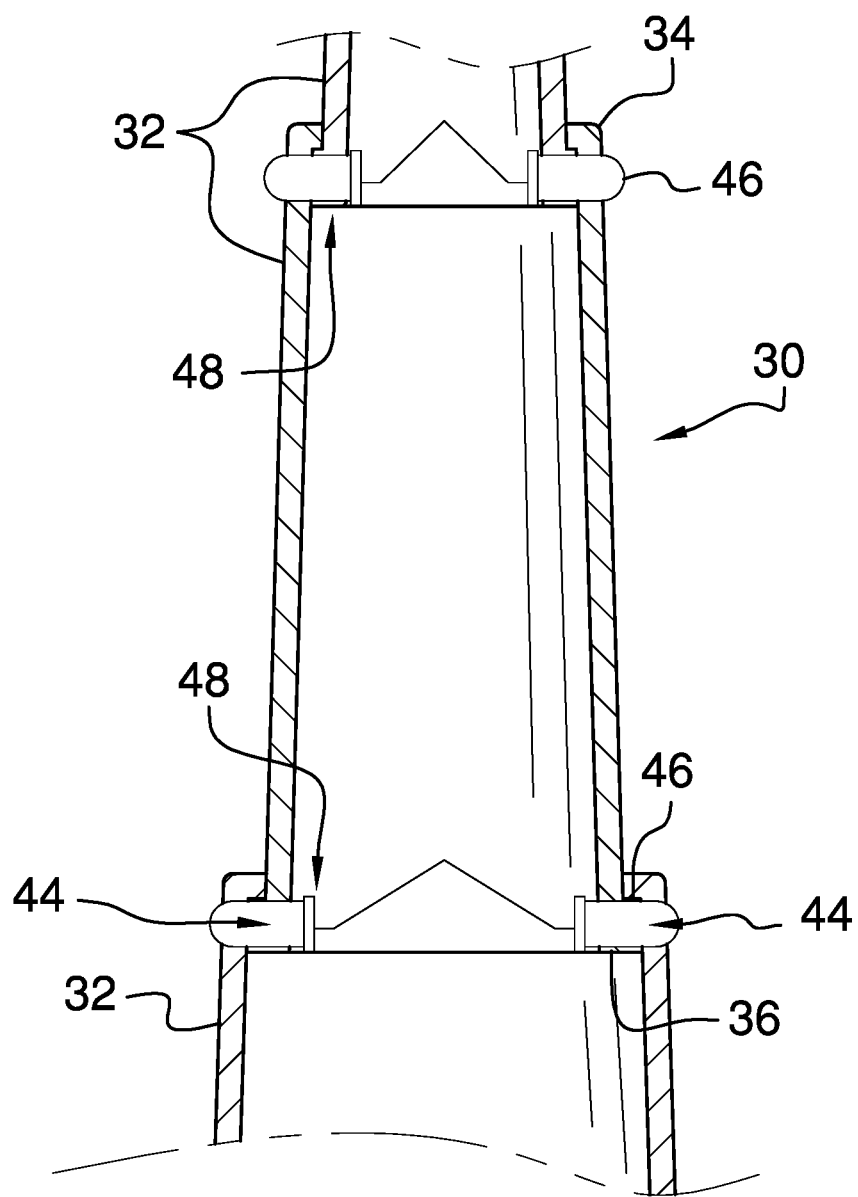
FIG. 5 is a cross sectional view taken along line 5-5 of FIG. 3 of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the object storage assembly 10 generally comprises a plurality of bases 12 and each of the bases 12 is selectively positioned on a support surface 14. The support surface 14 may be a table or other horizontal support surface 14. Each of the bases 12 has a top side 16 and a bottom side 18. The top side 16 corresponding to each of the bases 12 has a first well 20 extending downwardly therein and the first well 20 corresponding to each of the bases 12 has a bounding surface 22.

The plurality of bases 12 may include a first base 24, a second base 26 and a third base 28. Each of the first 24, second 26 and third 28 bases 12 may have a peripheral edge extending between the top side 16 and the bottom side 18. The peripheral edge corresponding to each of the first 24 and third 28 bases 12 may be continuous such that the first base 24 has a disk shape and the third base 28 has a cylindrical shape. The peripheral edge corresponding to the second base 26 may have a plurality of intersecting sides such that the second base 26 has a rectangular shape. A plurality legs may each be attached to the peripheral edge corresponding to the third base 28. The plurality of legs may abut the support surface 14.

A shaft unit 30 is provided and the shaft unit 30 is removably coupled to a selected one of the bases 12. Thus, the shaft unit 30 extends upwardly from the support surface 14. The shaft unit 30 has a telescopically adjustable length such that the shaft unit 30 has a maximum height ranging between approximately 1.8 meters and 2.1 meters.

The shaft unit 30 comprises a plurality of sleeves 32. Each of the sleeves 32 has a top end 34, a bottom end 36 and an outer wall 38 extending therebetween. The outer wall 38 tapers inwardly between the bottom end 36 and the top end 34. The plurality of sleeves 32 is slidably coupled together having the sleeves 32 being collinear with each other. Moreover, the plurality of sleeves 32 is selectively positioned between a minimum length and a maximum length.

The plurality of sleeves 32 includes a top sleeve 40 and a bottom sleeve 42. The outer wall 38 corresponding to each of the sleeves 32 has a pair of apertures 44 each extending therethrough. The pair of apertures 44 corresponding to each of the sleeves 32 is positioned on opposite sides of the corresponding sleeve 32. Additionally, the pair of apertures 44 on each of the sleeves 32 is positioned adjacent to the top end 34 of the corresponding sleeve 32.

A plurality of locks 46 is provided and each of the locks 46 is movably coupled to an associated one of the sleeves 32. Each of the plurality of locks 46 may be manipulated. Each of the locks 46 extends through an associated one of the apertures 44 such that the plurality of sleeves 32 is retained at the maximum height. The plurality of locks 46 may include a plurality of sets of locks 48. Each of the sets of locks 48 may include a pair of buttons and a biasing member. The biasing member may be positioned within the associated sleeve 32 and the biasing member may extend between each of the buttons. In this way the biasing member may bias each of the buttons to extend outwardly through the associated aperture 44.

A coupler 50 is coupled to and extends downwardly from the bottom end 36 corresponding to the bottom sleeve 42. The coupler 50 has an outer surface 52 and the outer surface 52 is threaded. The coupler 50 threadably engages the bounding surface 22 of the first well 20 in the selected base 12.

A rod 54 is provided that has a first end 56 and a second end 58. The rod 54 is comprised of a resiliently bendable material such that the rod 54 is manipulated to form a selected angle with respect to the shaft unit 30. The first end 56 is coupled to the top end 34 corresponding to the top sleeve 40. Moreover, the rod 54 may comprise a coiled spring or the like. A knob 60 is coupled to the second end 58 of the rod 54.

A plurality of holders 62 is provided and a selected one of the holders 62 is removably coupled to the shaft unit 30. The objects are positioned one the selected holder 62 thereby facilitating the objects to be organized and stored. Each of the holders 62 has an upper end 64 and a lower end 66. The lower end 66 has a second well 68 extending toward the upper end 64. The second well 68 corresponding to the selected holder insertably receives the knob 60 on the rod 54 such that the selected holder is removably coupled to the rod 54.

Each of the holders 62 includes at least one grip 70. The at least one grip 70 corresponding to each of the holders 62 has a unique structure with respect to each other. In this way each of the holders 62 may support a specific object. The plurality of holders 62 may include a book holder 72, a candle holder 74, a tray 76, a speaker holder 78, and a fishing pole holder 80. Additionally, the plurality of holders 62 may include a clip holder 82 that has a plurality of clips that may each be manipulated to engage the object. The plurality of holders 62 may include a hook holder 84 that has a plurality of hooks that may each have an object suspended therefrom.

The plurality of holders 62 may further include a clamp holder 86 that has a plurality of adjustable clamps. Each of the adjustable clamps may be manipulated to engage the object. The plurality of holders 62 may include a magnetic holder 88 that magnetically engages a ferromagnetic object.

In use, the shaft unit 30 is removably coupled to a selected base 12. The shaft unit 30 is manipulated to a selected height and a selected holder 62 is removably coupled to the knob 60. The objects are suspended from, positioned on and otherwise engaged to the selected holder 62. The plurality of holders 62 is interchangeable at any time with respect to the shaft unit 30. The shaft unit 30, the selected base 12 and the selected holder 62 are broken down for storage at any selected time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An object storage assembly being configured to support a plurality of objects thereby facilitating the objects to be organized and stored, said assembly comprising:
    a plurality of bases, each of said bases being configured to be positioned on a support surface;
    a shaft unit being removably coupled to a selected one of said bases wherein said shaft unit is configured to extend upwardly from the support surface, said shaft unit having a telescopically adjustable length such that said shaft unit has a maximum height ranging between approximately 1.8 meters and 2.1 meters, said shaft unit comprising a plurality of sleeves, each of said sleeves having a top end, a bottom end and an outer wall extending therebetween, said outer wall tapering inwardly between said bottom end and said top end, said plurality of sleeves being slidably coupled together having said sleeves being collinear with each other, said plurality of sleeves being selectively positioned between a minimum length and a maximum length, said plurality of sleeves including a top sleeve and a bottom sleeve;
    a plurality of holders, a selected one of said holders being removably coupled to said shaft unit wherein said selected holder is configured to have the objects positioned thereon thereby facilitating the objects to be organized and stored;
    a rod having a first end and a second end, said rod being comprised of a resiliently bendable material, said first end being coupled to said top end corresponding to said top sleeve;
    a knob being coupled to said second end of said rod; and
    each of said holders having an upper end and a lower end, said lower end having a second well extending toward said upper end, said second well corresponding to said selected holder insertably receiving said knob on said rod such that said selected holder is removably coupled to said rod.

2. The assembly according to claim 1, wherein each of said bases has a top side and a bottom side, said top side corresponding to each of said bases having a first well extending downwardly therein, said first well corresponding to each of said bases having a bounding surface.

3. The assembly according to claim 1, wherein said outer wall corresponding to each of said sleeves having a pair of apertures each extending therethrough, said pair of apertures corresponding to each of said sleeves being positioned on opposite sides of said corresponding sleeve, said pair of aperture on each of said sleeves being positioned adjacent to said top end of said corresponding sleeve.

4. The assembly according to claim 3, further comprising a plurality of locks, each of said locks being movably coupled to an associated one of said sleeves wherein said plurality of locks is configured to be manipulated, each of said locks extending through an associated one of said aperture such that said plurality of sleeves is retained at said maximum height.

5. The assembly according to claim 1, further comprising:
   each of said bases having a first well, said first well having a bounding surface; and
   a coupler being coupled to and extending downwardly from said bottom end corresponding to said bottom sleeve, said coupler having an outer surface, said outer surface being threaded, said coupler threadably engaging said bounding surface of said first well in said selected base.

6. The assembly according to claim 1, wherein each of said holders includes at least one grip, said at least one grip corresponding to each of said holders having a unique structure with respect to each other wherein said at least one grip corresponding to each of said holders is configured to support a specific object.

7. An object storage assembly being configured to support a plurality of objects thereby facilitating the objects to be organized and stored, said assembly comprising:
   a plurality of bases, each of said bases being configured to be positioned on a support surface, each of said bases having a top side and a bottom side, said top side corresponding to each of said bases having a first well extending downwardly therein, said first well corresponding to each of said bases having a bounding surface;
   a shaft unit being removably coupled to a selected one of said bases wherein said shaft unit is configured to extend upwardly from the support surface, said shaft unit having a telescopically adjustable length such that said shaft unit has a maximum height ranging between approximately 1.8 meters and 2.1 meters, said shaft unit comprising:
      a plurality of sleeves, each of said sleeves having a top end, a bottom end and an outer wall extending therebetween, said outer wall tapering inwardly between said bottom end and said top end, said plurality of sleeves being slidably coupled together having said sleeves being collinear with each other, said plurality of sleeves being selectively positioned between a minimum length and a maximum length, said plurality of sleeves including a top sleeve and a bottom sleeve, said outer wall corresponding to each of said sleeves having a pair of apertures each extending therethrough, said pair of apertures corresponding to each of said sleeves being positioned on opposite sides of said corresponding sleeve, said pair of aperture on each of said sleeves being positioned adjacent to said top end of said corresponding sleeve,
   a plurality of locks, each of said locks being movably coupled to an associated one of said sleeves wherein said plurality of locks is configured to be manipulated, each of said locks extending through an associated one of said aperture such that said plurality of sleeves is retained at said maximum height,
   a coupler being coupled to and extending downwardly from said bottom end corresponding to said bottom sleeve, said coupler having an outer surface, said outer surface being threaded, said coupler threadably engaging said bounding surface of said first well in said selected base,
   a rod having a first end and a second end, said rod being comprised of a resiliently bendable material, said first end being coupled to said top end corresponding to said top sleeve, and
   a knob being coupled to said second end of said rod; and
   a plurality of holders, a selected one of said holders being removably coupled to said shaft unit wherein said selected holder is configured to have the objects positioned thereon thereby facilitating the objects to be organized and stored, each of said holders having an upper end and a lower end, said lower end having a second well extending toward said upper end, said second well corresponding to said selected holder insertably receiving said knob on said rod such that said selected holder is removably coupled to said rod, each of said holders including at least one grip, said at least one grip corresponding to each of said holders having a unique structure with respect to each other wherein said at least one grip corresponding to each of said holders is configured to support a specific object.

* * * * *